United States Patent

Weil

[15] 3,672,221
[45] June 27, 1972

[54] TEMPERATURE SENSOR
[72] Inventor: Raoul B. Weil, Olivette, Mo.
[73] Assignee: Monsanto Company, St. Louis, Mo.
[22] Filed: Dec. 19, 1969
[21] Appl. No.: 886,637

[52] U.S. Cl. .....................73/339 R, 73/355 R, 250/83.3 H, 350/160 P
[51] Int. Cl. ..........................................G01k 11/12
[58] Field of Search ...............73/339, 355; 250/83.3 IR; 350/160, 160 P

[56] References Cited

UNITED STATES PATENTS

| | | | |
|---|---|---|---|
| 3,591,810 | 7/1971 | Jackson | 350/160 P |
| 2,792,484 | 5/1957 | Gurewitsch et al. | 73/355 X |
| 3,252,374 | 5/1966 | Stookey | 350/160 P |
| 3,453,434 | 7/1969 | Takami et al. | 73/355 X |
| 3,462,224 | 8/1969 | Woods et al. | 73/355 UX |

Primary Examiner—Louis R. Prince
Assistant Examiner—Frederick Shoon
Attorney—William I. Andress, John D. Upham and Neal E. Willis

[57] ABSTRACT

The disclosure herein relates to a method for monitoring the temperature of a material transparent to a given part of the electromagnetic spectrum or of a body in good thermal contact with the material. The preferred method referenced herein utilizes laser radiation to measure variations in the index of refraction of a material with temperature variations. Alternative embodiments refer to variations in the transmission coefficient and reflection coefficient with variation in temperature.

5 Claims, 6 Drawing Figures

TEMPERATURE SENSOR

BACKGROUND OF THE INVENTION

This invention relates to the field of temperature measurement.

Current and prior art methods commonly used for measuring temperature changes include thermometers utilizing variations in length, volume, pressure, resistivity or magnetic susceptibility with temperature. Other temperature gauges include thermo-couples and pyrometers using black body color as the measure of temperature.

Thermometers now in use have numerous limitations with respect to temperature variation ranges, the inability to precisely detect and measure temperature changes at remote distances and in many cases the need for observing and/or recording temperature changes at the location of the temperature sensor. In addition, the ability to detect narrow or small temperature variations or extreme temperatures is dependent upon the use of expensive and sometimes sophisticated components, equipment and apparatus.

SUMMARY OF THE INVENTION

The present invention relates to a method for the precise determination of temperatures and temperature variations of materials over a range of from near absolute zero to close to the melting point of the material. Broadly, the method described herein makes use of electromagnetic energy, e.g., laser beams, to measure variations with temperature in the index of refraction of materials transparent to a given part of the electromagnetic spectrum to monitor the temperature and temperature variations of the material or of a body in good thermal contact with it. In one embodiment of the invention temperature variations are ascertained by making use of variations in the transmission coefficient with variations in the index of refraction of the material. In another embodiment temperature variations are ascertained by making use of the variation in the reflection coefficient of the material when the index of refraction varies.

It is, therefore, an object and advantage of the present invention to provide temperature sensors which do not have the above-mentioned and other limitations of prior art temperature sensors.

DESCRIPTION OF PREFERRED EMBODIMENTS

The present invention is based upon the use of variations in the index of refraction of materials to detect and measure temperature changes of the material or a body in good thermal contact with the material. The sensor material to be utilized in practicing this invention must be transparent to the energy source of a given part of the electromagnetic spectrum and whose length and index of refraction change with a change in temperature. These properties permit the use of energy transmitted through or reflected within the sensor to detect and measure variations in the transmission coefficient and reflection coefficient when the index of refraction varies in response to temperature changes.

In the preferred embodiments described herein and of particular utility, the electromagnetic energy source utilized is monochromatic and coherent, i.e., laser beams, and the sensor material is gallium arsenide, GaAs.

EXAMPLE 1

In one embodiment of the invention, use is made of the variation in the transmission coefficient of the sensor material with a variation in the index of refraction to detect and measure temperature changes. In order to confirm calculated results with measured results, the experimental set-up shown schematically in FIG. 1 was used.

Figure 1:
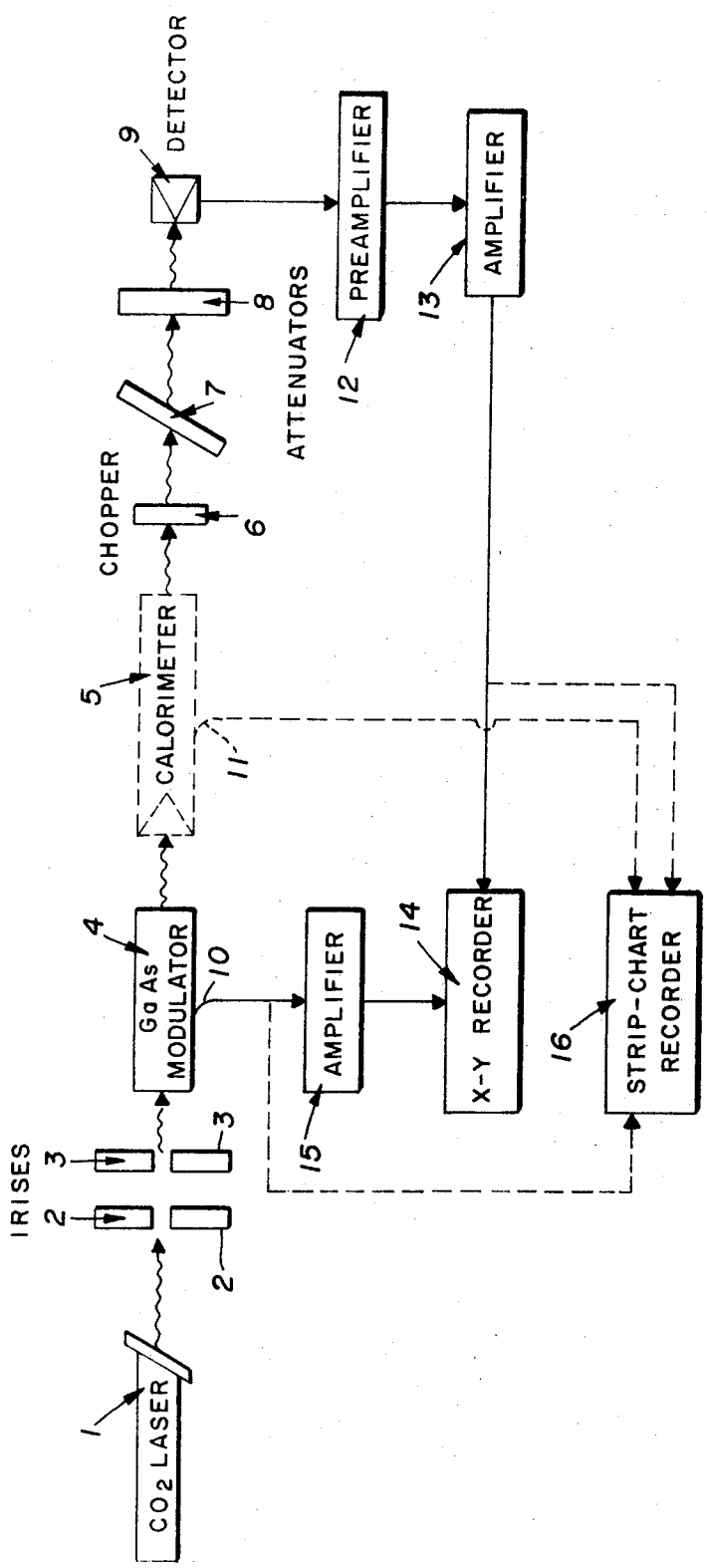
In FIG. 1 is shown a schematic diagram of the laboratory apparatus used for measuring the transmission of energy through a sensor material as a function of temperature, and for measuring the absorption of the material at a given wavelength of input energy.

Referring to FIG. 1, the sensor material 4 was a GaAs laser modulator crystal (Monsanto MM40) which is a rectangular parallelepiped bar of semi-insulating, single crystal, n-type GaAs doped with chromium and having a resistivity of $3.0 \times 10^{18}$ ohm-cm and a carrier mobility of 450 cm$^2$/volt-sec. The GaAs bar was $5.09 \pm 0.01$ cm long in the [1$\bar{1}$0] direction with a cross section of $0.3027 \times 0.3022$ cm in the [110] and [001] directions, respectively. The [1$\bar{1}$0] faces were polished flat to within one wavelength of sodium light and parallel to better than 0.003 mm.

The temperature of the GaAs sensor was measured with a Cu-constantan thermocouple 10. This device was made of 0.003 in. wire (Omega Engineering, Inc.). An NBS calibration (Shenker et al. Reference Tables For Thermocouples, NBS Circ. 561,1955) was used to convert the measured emfs to temperatures. The calibration was also verified, for the thermocouple used, against an NBS calibrated Pt resistance thermometer, and found to agree within:

Pt − Cu Const. = −(0.06 ± 0.002° C., over the over the range used. The thermocouple was fastened to the sensor by means of a 2 × 4 mm strip of Scotch "Magic Tape".

The sensor was held in a groove in a wooden block and covered with 9 mm of Styrofoam for insulation (not shown). Heating of the sensor was accomplished by shining a 250 W infrared heater lamp on the sensor holder.

The source of radiation 1 was a Seed Electronics Type ML 1C CO$_2$ laser, operated at about 3 watts CW output. The beam cross section was reduced by means of irises 2 and 3 ahead of the sensor. The diameter of the beam going through the sample was 2.0 mm and carried about 0.5 watts of 10.6$\mu$ wavelength linearly polarized light. After passing through the sample, the light was chopped by chopper 6 at 13 cps so as to be in synchronism with a tuned amplifier 13 connected to the thermocouple type detector 9 (Perkin Elmer Type 127–1978). The beam was then strongly attenuated between the chopper and the detector by attenuators 7 and 8 to insure that the detector would operate in its linear region. Attenuator 7 (a partly crossed analyzer) was a Brewster angle germanium analyzer set at 84.5° from the direction of polarization of the incident beam; the results obtained with this attenuator did not differ from those obtained with screen-type attenuators. Attenuator 8 was neutral density screen attenuator. Care was exercised in positioning the sensor in the beam so as to make the angle of incidence normal. This insured the space coincidence of the beams reflected from the two interfaces.

To perform the measurement of transmission as a function of temperature, the output of the detector was directed through preamplifier 12 and amplifier 13 and the amplified signal applied to the Y-axis of an X—Y recorder 14, or optionally to one pen of a double pen strip-chart recorder 16. The output of the sensor thermocouple was applied, respectively, through amplifier 15 to the X-axis of the X—Y recorder or optionally directly to the other pen of the strip-chart instrument. The calibration of the instruments used was verified to ascertain the accuracy of the results.

To measure the absorption of the material at the 10.6$\mu$ wavelength used, another MM 40 modulator made of the same boule, with antireflection coatings, was used. Its temperature rise due to absorption losses only was measured while the output beam power was simultaneously measured. The latter measurement was performed by monitoring with thermocouple 11 the temperature of a calorimeter 5 in which the beam was fully absorbed. The calorimeter consisted of a copper block with a blackened conical cavity into which the beam was directed. The sensor and calorimeter thermocouples outputs were simultaneously recorded on the double pen strip chart recorder, and from these data both the beam power and the power lost in the GaAs sensor were calculated. The calorimeter was used only for beam power determination.

Figure 2:
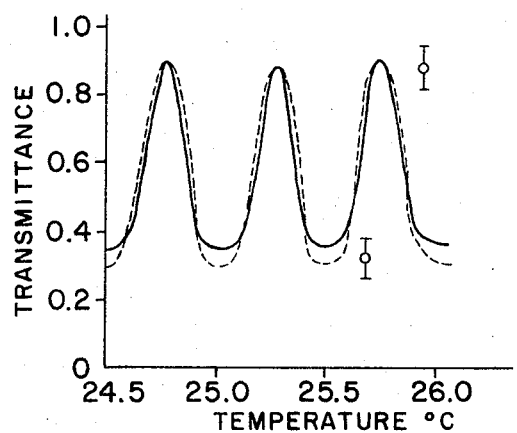
FIG. 2 is a graph of the energy intensity transmitted through sensor material as a function of the material temperature.

FIG. 2 is a graph of the beam intensity (with noise removed from the experimental curve) going through the sensor as a function of the sensor temperature. The solid line is the measured curve of the recorder trace and the dashed line is the curve calculated by use of the equation below given by Born and Wolf. (Born et al. Principles of Optics, page 628, 2nd Ed. 1964. The Macmillan Co., New York. The factor $\exp(-2v_2 n)$ in the numerator of Born et al.'s Eq. (24) should not have been included and was not used in the calculations here.). The equation expresses the transmission of radiation from a medium of index of refraction $n_1$ through a thin film with index $n_2$ and absorption $V_2$ to a medium $n_3$. In the present case the GaAs sensor was treated as the "thin film" with index $n$ (rather than $n_2$, for simplicity in the equations below), and since media 1 and 3 were air, $n_1 = n_3 = 1$. In the present case of GaAs sensors the absorption at 10.6 is very small; then, for normal incidence the equation in question reduces to:

$$T = \frac{16n^2/(1+n)^4}{e^{\alpha L} + \left(\frac{1-n}{1+n}\right)^4 e^{-\alpha L} - 2\left(\frac{1-n}{1+n}\right)^2 \cos\left(\frac{4\pi L n}{\lambda_0}\right)} \quad (1)$$

where $T$ is the transmission coefficient, $n$ and $\alpha$ are, respectively, the index of refraction and absorption coefficients of GaAs, both measured at a temperature to and at the wavelength of the incoming radiation, $\lambda_0$, $l$ is the length of the sensor bar and $\lambda_0$ is a wavelength of the incident radiation in air. To calculate the curve, $\alpha$ was taken as $0.012 \pm 0.002$ cm$^{-1}$ which is the value measured calorimetrically; and $n$ was taken from the literature as $3.4 \pm 0.15$ (M. Cardona, Proc. Int. Conf. Semicond. Phys., Prague 1960, Academic Press, N. Y. (1961) page 318). The error marks shown on the graph in FIG. 2 refer to the calculated curve and result from the limits on the accuracy of the absorption coefficient and index of refraction (the probable error is higher in the valleys of the curves than at the peaks).

The oscillations of the curve, i.e., the variation in transmittance with temperature $t$, arise almost entirely from changes in the cosine term in Equation (1). If one lets $$\psi = (4 \pi l n/\lambda_0) \quad (2)$$

then, $$\Delta \psi = (4 \pi l n \Delta t/\lambda_0)(\gamma + \delta), \quad (3)$$

where $\gamma$ is the expansion coefficient $(1/l)(dl/dt)$, and $\delta$ is the temperature coefficient of the refractive index, $(1/n) dn/dt$, and $t$ stands for temperature.

In Equation (3), a complete cycle will have been traversed for $\Delta \psi = 2\pi$; if $l$, $n$, $\lambda_0$ and $\gamma$ are known, and the $\Delta t$ corresponding to $\Delta \psi$ is measured, one can determine $\delta$:

$$\delta = (\Delta \psi/\Delta t)(\lambda_0/4 \pi l n) - \gamma. \quad (4)$$

From the measurement of the temperature difference in 25 oscillations it was determined that for the sensor bar 4 $\Delta t = 0.484 \pm 0.002°$ C. for $\Delta \psi = 2\pi$. By using the literature value $\gamma = (0.686 \pm 0.013) \times 10^{-5}$ (°c.)$^{-1}$, (E. D. Pierron et al., Acta Cryst. 21, 290, 1966), and the $n$, $\lambda_0$ and $l$ mentioned earlier, it is found that $$\delta = (1/n)(dn/dt) = (5.64 \pm 0.28) \times 10^{-5} \text{ (°c.)}^{-1}. \quad (5)$$

Most of the uncertainty in $\delta$ results from the uncertainty in $n$.

As shown in FIG. 2, which is a plot of transmittance as a function of temperature, the curves for both the measured and calculated transmissions vary from about 90 percent maximum transmission to about 35 percent minimum transmission (about 30 percent calculated) with a temperature change of approximately 0.25° C. The good fit of the calculated and measured curves establishes the reliability and precision of the method and the utility of measuring temperature changes with variations in the transmission of energy through a body to provide a unique temperature sensor.

When the faces of the sensor material are antireflection coated with films yielding 5.5 percent residual reflection, oscillations with temperature with a peak to peak amplitude of 7.5 percent are observed when the sensor is accurately positioned.

It was also observed that when the sensor material is cooling it tends to remain in the peak region of the transmission curve, while when the sensor is being heated it tends to dwell in the valleys. This self regulation occurs because the absorption loss is proportional to the energy passing through the sample. Consequently, a cooling GaAs sensor bar will cool slower and a heating bar will heat faster when more energy passes through it.

The good fit of the calculated and measured curves (FIG. 2) further indicate that the GaAs used was homogeneous and the faces flat and parallel to within dimensions which are small compared with the $10.6/3.4 = 3.12\mu$, wavelength of radiation. The experiment also illustrates the importance of considering interference effects when using GaAs devices, e.g., as modulators in a $CO_2$ laser beam.

EXAMPLE 2

Figure 3:
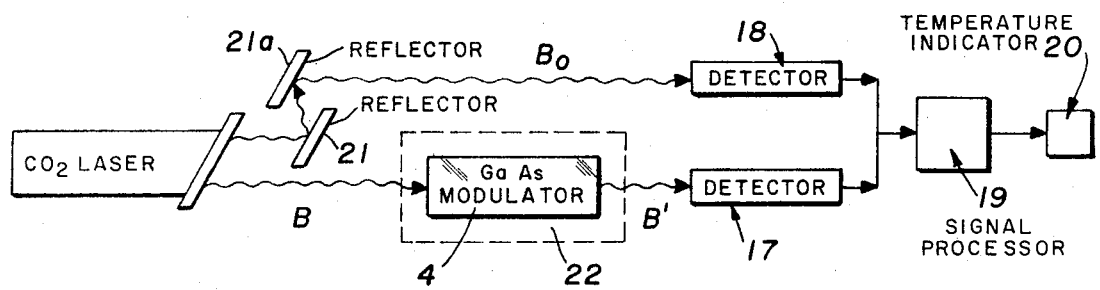
In FIG. 3 is shown a schematic diagram of a system configuration for detecting and measuring the intensity of electromagnetic energy transmitted through a sensor material remote from the energy source and means for converting the intensity signal to temperature values.

In FIG. 3 is illustrated an application of the utility of the temperature sensor according to this invention, the working principles of which were demonstrated in Example 1. In this embodiment, the sensor material 4, e.g., GaAs is situated at a distance remote from the energy source 1, e.g., a $co_2$ laser as used in Example 1. The temperature changes within the sensor material itself may be measured or, optionally, the temperature variations of a body 22 in good thermal contact with the sensor may be measured. When a beam of coherent light B is directed from laser 1 through sensor 4, the output beam $B_1$ is detected in detector 17. In some situations variations might occur in the incident beam B, either from the energy source or the medium through which the energy beam passes. In these situations, a reference beam $B_o$ is directed from the energy source by means of reflectors, e.g., mirrors 21 and 21a to detector 18 to determine the 100 percent transmission level. Of course, reference beam $B_o$ need not be used where there is no concern for variations in the input energy or medium through which it passes.

The intensity of the energy transmitted through the sensor is measured in detector 17 and the output signal from the detector is directed to signal processor 19 where the output signal either is compared with the signal from the reference beam and converts the resultant signal from the comparison to temperature values which are observed or recorded on readout device 20, or when beam $B_o$ is not used the output signal is converted directly to temperature values. The temperature variations detected and measured by this system may be telemetered to monitoring stations remote from temperature event.

EXAMPLE 3

This Example will set forth alternative modifications of the foregoing embodiments for the purpose of increasing or decreasing the sensitivity of the temperature sensor to less than or greater than a temperature range of 0.25° C. as shown above.

Figure 4:
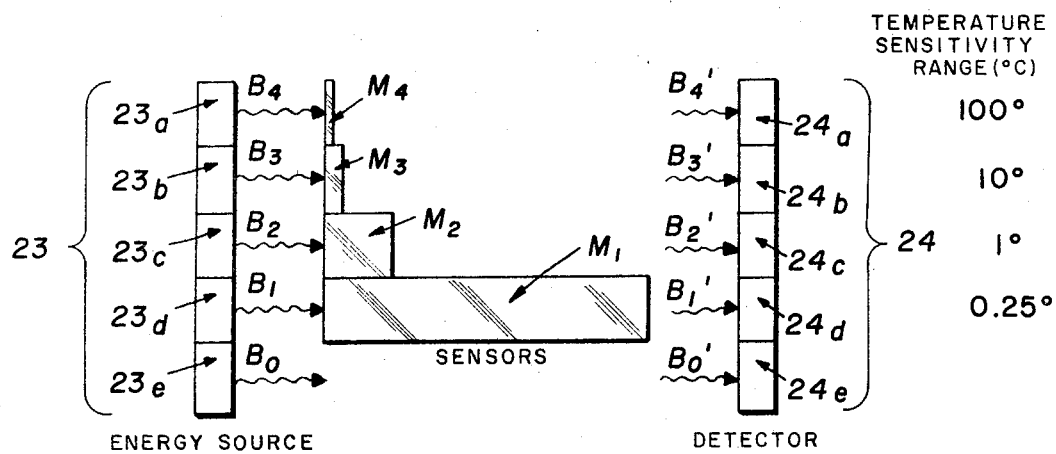
FIG. 4 is a schematic chart illustrating the relationship between energy transmission through sensor material of differing lengths and temperature sensitivity ranges (maximum-to-minimum transmission) corresponding to said lengths at a given wavelength.

One embodiment for increasing the temperature range over which a maximum-to-minimum transmission occurs is shown in FIG. 4. In FIG. 4 are shown several lengths of sensor material $M_1 - M_4$ transparent to a given part of the electromagnetic spectrum. For purposes of illustration the sensor material, GaAs of the same properties described in Example 1, and radiant energy beams $B_0$ 14 $B_4$ of wavelength $\lambda_0 = 10.6\mu$ are used. The energy source 23 can be either a single wide-aperture source, a single narrow-aperture source with scanning means for the various sensors $M_1 - M_4$ or from multiple sources as in 23 $a - e$. Similarly, the transmitted beams $b_o{}^1$ $B_4{}^1$ can be detected by a single detector 24 which can monitor each beam sequentially or by a series of properly positioned detectors 24 $a$ 14 $e$. Beam $B_o$ does not pass through the sensor material and is used to determine the 100 percent transmission level. As in the preceding examples, sensor material $M_1$ is 5.09 cm long; beam $B_1{}^1$ passing through sensor $M_1$ will vary from maximum-to-minimum transmission over a temperature range of 0.25° C; beam $B_2{}^1$ passing through 1.25 cm of sensor material $M_2$ will show a variation with a temperature change of 1° C. Similarly, beams $B_3{}^1$ and $B_4{}^1$ passing through sensor materials $M_3$ and $M_4$ of 0.125 and 0.0125 cm lengths, respectively, will vary from maximum-to-minimum transmission over ranges of 10° and 100° C., respectively.

In contrast to increasing the temperature sensitivity range as described above one can decrease the temperature sensitivity range by increasing the length of the sensor material to a length corresponding to a maximum-to-minimum transmission variation for the desired temperature sensitivity range.

Another method for increasing or decreasing the temperature sensitivity range involves the use of materials $M_1 - M_4$ (FIG. 4) which differ not only in length, but also in elemental composition having a different index of refraction $n$ from that of the GaAs exemplified above.

In still another embodiment for changing the temperature sensitivity range, reference is made to Equation (3) above; from this equation:

$$\Delta t_\pi = \frac{\lambda_0}{4L_n(\gamma + \delta)} \qquad (6)$$

where $\Delta t\pi$ is the change in temperature required to produce a maximum-to-minimum change in transmittance. Thus, for large $\lambda_0$, $\Delta t\pi$ is large. Conversely, when $\lambda_0$ is small, $\Delta t\pi$ is small and a maximum-to-minimum change in transmittance is produced with small changes in temperature. Hence, by varying the frequency $\lambda_0$ of the source energy one can increase or decrease the temperature sensitivity of the sensor material.

EXAMPLE 4

Another embodiment of this invention makes use of the variation in the reflection coefficient of the sensor material when the index of refraction varies. The reflection coefficient of the material, under the same conditions noted above, i.e., monochromatic, coherent electromagnetic energy and sensor material transparent thereto and having flat and parallel polished surfaces, will also vary cyclically with temperature, with the same temperature period as in the case of transmission described above.

Figure 5:
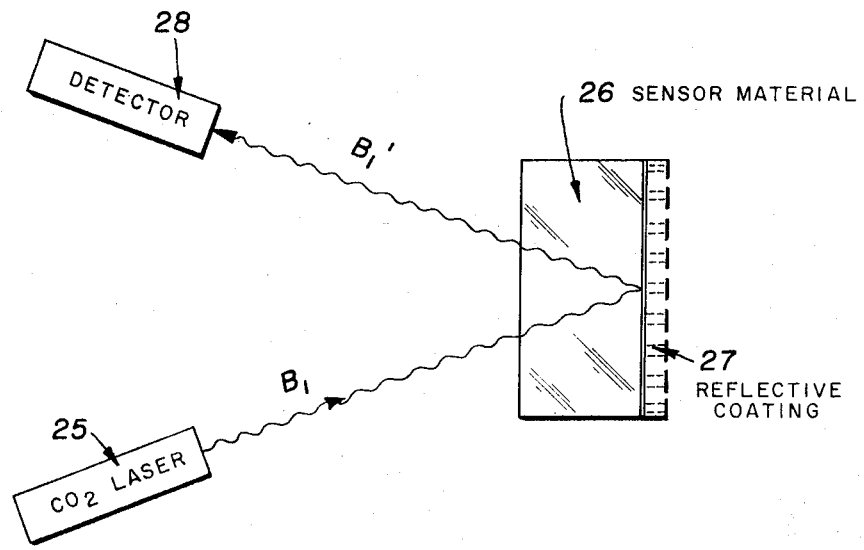
FIG. 5 is a schematic diagram of a system configuration for detecting and measuring the intensity of reflected energy in a sensor material as a function of temperature.
Figure 6:
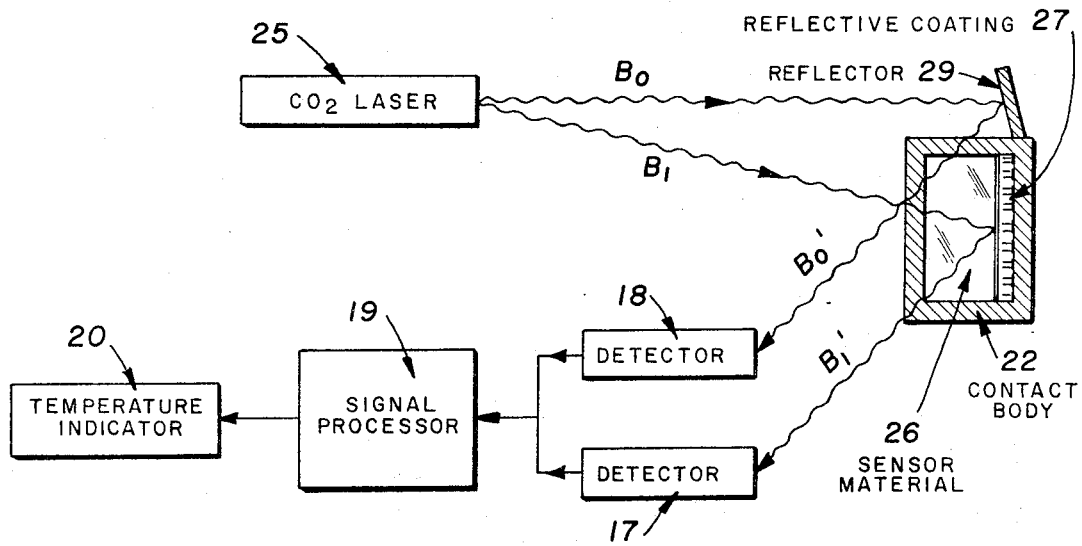
FIG. 6 is a schematic diagram of an application of the system configuration shown in FIG. 5 for detecting and measuring temperature variations in a body remote from the energy source.

In FIG. 5 is shown a configuration in which the incoming beam $B_1$ from energy source 25 is reflected from the front and back surfaces of sensor material 26 which may have a highly reflective coating 27; the intensity of the reflected beam $B_1{}^1$ is detected and measured in detector 28. The intensity of the reflected beam changes in a cyclic manner as described in the transmission embodiment above. In FIG. 6 is shown a schematic diagram of an application embodiment of the system configuration shown in FIG. 5. In this embodiment, the sensor material 26, e.g., GaAs as above, is situated in good thermal contact with a body 22, e.g., a satellite, remote from the energy source 25 and/or detectors 17 and 18. As described above in the transmission case, variations in the input energy or in the medium through which it passes may render it necessary or desirable to make use of a reference beam $B_o$, which is reflected from reflector 29 attached to body 22 and received by detector 18. When a beam $B_1$ of energy, e.g., coherent laser radiation, is directed to the sensor material it is reflected from the front and back surfaces of the sensor and the reflected beam $B_1{}^1$ is received by detector 17. The intensity of the reflected beams is measured in the detectors from which the output signal is directed to signal processor 19 which converts the intensity signal to temperature values which are relayed to readout device 20. As the temperature of the body, and, hence, of the sensor varies, the intensity of the reflected beam changes in a cyclic manner as in the case of transmission described above.

In the reflection embodiment, as in the transmission embodiment, the sensitivity of temperature changes can be altered by changes in the sensor material, the length of the sensor material, the wavelength of radiant energy or a combination of these.

While the foregoing embodiments described the use of GaAs as the sensor material, it will be appreciated that any material transparent to a given part of the electromagnetic spectrum can be used herein. The material selected should be such that the variation in its absorption coefficient $\alpha$ with temperature is small in the temperature range concerned and $\alpha$ itself be only on the order of a few percent per cm. One may readily ascertain suitable crystal transparencies by reference to standard tables of optical and electrical properties which list transmission and absorption data for crystalline and amorphous materials. By way of illustration only, suitable materials include the alkali halides, e.g., NaCl and KCl, cadmium sulfide and cadmium telluride, Ge and various glasses.

Various other modifications may be made in the invention without departing from the spirit or scope thereof.

I claim:
1. Temperature sensing systems comprising in combination:
   a. at least one body of single-crystal, semi-insulating gallium arsenide transparent to a given part of the electromagnetic spectrum and whose length and index of refraction change with a change in temperature;
   b. means for irradiating said body with electromagnetic energy at frequencies in the range in which said body is transparent;
   c. means for detecting and measuring the intensity of that part of said energy not absorbed by said body; and
   d. means for indicating the intensity output signal from said detecting and measuring means in temperature values.
2. Temperature sensing systems according to claim 1 wherein said body of material is in good thermal contact with a second body the temperature variation of which is to be monitored.
3. Temperature sensing systems according to claim 1 wherein the sensitivity of said body to temperature variations is determinable in accordance with variations of parameters on the right-hand side of the equation:

$$\Delta t_\pi = \frac{\lambda_0}{4L_n(\gamma + \delta)}$$

wherein $\Delta t\pi$ equals the change required to produce a change from maximum to minimum output energy; $\lambda_o$ is the wavelength of input energy; $L$ is the length of said body, $\gamma$ is the expansion coefficient and $\delta$ is the temperature coefficient of the index of refraction.
4. Temperature sensing systems according to claim 3 wherein a plurality of bodies of material transparent to a given part of the electromagnetic spectrum are used.
5. Temperature sensing systems according to claim 4 wherein at least one of said bodies is a material different from other of said bodies and the sensitivity of each of said bodies controllable by varying any of the said parameters in the equation.

* * * * *